US008711749B2

(12) United States Patent
Wu (10) Patent No.: US 8,711,749 B2
(45) Date of Patent: Apr. 29, 2014

(54) INFORMATION OBTAINING AND NOTIFICATION, DATA MESSAGE FORWARDING AND HANDOVER METHOD AND ACCESS NODE

(75) Inventor: Qiang Wu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 109 days.

(21) Appl. No.: 13/501,330

(22) PCT Filed: Sep. 28, 2010

(86) PCT No.: PCT/CN2010/077425
§ 371 (c)(1),
(2), (4) Date: Apr. 11, 2012

(87) PCT Pub. No.: WO2011/044819
PCT Pub. Date: Apr. 21, 2011

(65) Prior Publication Data
US 2012/0201224 A1    Aug. 9, 2012

(30) Foreign Application Priority Data

Oct. 17, 2009    (CN) .......................... 2009 1 0174823

(51) Int. Cl.
*H04W 4/00*    (2009.01)
(52) U.S. Cl.
USPC ........... 370/311; 370/310; 370/338; 370/328; 370/329; 370/331; 455/403; 455/422.1; 455/436
(58) Field of Classification Search
USPC ........ 370/356, 351–355, 331, 332, 329, 338; 370/389, 311, 328, 401, 395.54, 395.53; 455/436, 435.1, 432.1, 411, 410, 455/404.2, 403, 422.1; 709/230; 719/315, 719/328; 713/151
See application file for complete search history.

(56) References Cited

U.S. PATENT DOCUMENTS

| 6,272,129 B1* | 8/2001 | Dynarski et al. ............... 370/356 |
| 2009/0059866 A1* | 3/2009 | Chen et al. ..................... 370/331 |
| 2012/0202502 A1* | 8/2012 | Wu ................................ 455/436 |

FOREIGN PATENT DOCUMENTS

| CN | 1933663 A | 3/2007 |
| CN | 101119312 A | 2/2008 |
| JP | 2004112727 | 4/2004 |

OTHER PUBLICATIONS

International Search Report for PCT/CN2010/077425, English translation attached to original, Both completed by the Chinese Patent Office on Nov. 22, 2010, All together 6 Pages.

Dong et al. "Research on Universal Network Supporting Pervasive Services", Acta Electronica Sinica Apr. 2007, vol. 35, No. 4, p. 599-606.

* cited by examiner

Primary Examiner — Charles C Jiang
Assistant Examiner — Walli Butt
(74) Attorney, Agent, or Firm — Brooks Kushman P.C.

(57) ABSTRACT

An information obtaining, information notification, data message forwarding and switch method and an access node during a terminal switch process are provided. The access node comprises an opposite end information storage unit, which is set to store identification and locator mapping information of correspondent nodes of all accessed terminals; an message transceiver unit, which is set to: after establishing a connection with the terminal that switches to the local access node, receive a data message sent by the terminal to the correspondent node, according to the identification of the correspondent node in the data message, initiate an inquiry to a home ILR or an original access node of the terminal before switch-in to acquire and locally store the mapping information of the correspondent node, if the identification and locator mapping information of the correspondent node cannot be locally searched out.

27 Claims, 4 Drawing Sheets

INFORMATION OBTAINING AND NOTIFICATION, DATA MESSAGE FORWARDING AND HANDOVER METHOD AND ACCESS NODE

CROSS-REFERENCE TO RELATED APPLICATION

This application is the U.S. national phase of PCT Appln. No. PCT/CN2010/077425 filed Sep. 28, 2010 which claims priority to Chinese Application No. 200910174823.5 filed Oct. 17, 2009, the disclosures of which are incorporated in their entirety by reference herein.

TECHNICAL FIELD

The present invention relates to the field of communication technologies, and more especially, to an information obtaining and notification, data message forwarding and switching method and an access node.

BACKGROUND OF THE RELATED ART

The IP address in the TCP/IP (Transmission Control Protocol/Internet Protocol) widely used in the existing Internet has a dual function, and it can act as the locator of the correspondent terminal host network interface of the network layer in the network topology and also the identification of the host network interface of the transport layer. At the first stage of the TCP/IP protocol design, the moving of the host is not considered, however, when the moving of the host is more and more common, the semantic overload defect of this IP address has become increasingly evident. When the IP address of a host changes, not only the route but also the identification of the communication terminal host change, which will lead to heavier and heavier routing load, and moreover, the change of the host identifier will interrupt the connections and the applications. The purpose of proposing the identification and location separation problem is to solve problems such as the semantic overload of the IP address and the too heavy routing load, to separate the dual function of the IP address so as to achieve supporting to problems such as mobility, multi-home, dynamic IP address re-allocation, routing load reduction and the exchange visits between different network regions in the next generation Internet.

In the related art, the network router based method is one of the solutions to separate the identification and the location. In the related art, a method for implementing the mobile switching management based on the network router solution is proposed, in this method, the access switch router notifies the access switch router in which the correspondent nodes (referred to as CN) of all the mobile terminals are located of the new mapping information of a mobile node (MN).

In the switch process in the related art, the information of all the CNs is saved in the access switch router for each MN that accesses locally, as shown in the following table:

| Identification | Locator | CN 1 | ... | CN N |
| --- | --- | --- | --- | --- |

In the switch process, the access switch router at the switch-out side needs to send this correspondent node table to the access switch router at the switch-in side, the access switch router at the switch-in side notifies the access switch router in which the CN is located of the MN's new identifier mapping information based on this information.

There are mainly the following problems in the switch process in the related art:

1. for many service applications, such as the P2P (peer-to-peer) and so on, in the existing network, each MN has dozens or even hundreds of CNs and it is needed to establish, store and maintain the correspondent node table in network devices such as the access switch router, the access service node (referred to AN), or the identity location register, which needs to take up a lot of memory and CPU processing performance and needs complicated signaling flow processing between the devices;

2. when data communication is performed between the MN and the CN, the AN at the switch-out side of the MN needs to synchronize information of all the CNs of the MN to the identity location register (referred to as ILR), the ILR stores the information of all the CNs communicating with the MN and maintains the accuracy of the information of the correspondent node through signaling messages between the ILR and the AN. In the switch process, the AN at the switch-in side allocates a new RID to the MN, and a mapping update process is initiated between the ILR and the AN at the switch-in side or the switch-out side. After the mapping update flow ends, the ILR notifies the AN where all the CNs are located of the MN's new identifier mapping information according to the saved information of the CNs;

alternatively, in the switch process, the AN at the switch-out side synchronizes the information of all the CNs of the MN to the AN at the switch-in side, the AN at the switch-in side saves the information of all the CNs of the MN, after a new RID is allocated to the MN, the new mapping information of the MN is notified to the AN where all the CNs are located according to the saved information of all the CNs;

3. after the data communication relationship is established between the MN and the CN, the AN in which the CN is located saves the real-time identification-locator mapping information of the MN. The purpose of the network device establishing, storing and maintaining the correspondent node table is to guarantee that the correspondent node can be notified timely in the case that the accessed MN is allocated with new routing identifier, so as to ensure that the identification-locator mapping information of the correspondent node saved by the AN is real-time effective, thereby the data message sent by the CN are able to be routed to the AN at the switch-in side of the MN after the newest RID is encapsulated in the data message. After the peer-to-peer connection between the MN and the CN is disconnected, the AN in which the MN is located no longer notifies the AN in which the CN is located of the mapping information change of the MN. Therefore, after the peer-to-peer connection between the MN and the CN is disconnected, the network device needs to delete the MN from the CN's correspondent node table. When all terminals accessing to the AN in which the CN is located have no communication with the MN, the mapping and routing table entry of the MN should be deleted from the AN in which the CN is located. Wherein, when the network device needs to delete the MN from the CN's correspondent node table, the AN in which the CN is located needs to identify and monitor the peer-to-peer connection which is identified by the MN-CN, and determine the connected/disconnected state of the peer-to-peer connection, which requires that the AN in which the CN is located forwards all the data messages in the way of data streams, if a certain data stream has no data to send in a time period, the data stream is considered as in the disconnected state. Compared with the method used in the existing routers and other equipments for forwarding the data messages one by one, forwarding data in the way of data streams increases the load for processing data stream establishment, data stream mapping, and data stream connected/disconnected monitoring and so on, which makes the implementation of AN complicated.

SUMMARY OF THE INVENTION

The present invention provides an information acquisition method for an access node at the switch-in side to acquire the mapping information of a correspondent node of a terminal in a switch process.

In order to solve the aforementioned problem, the present invention provides an information acquisition method in a switch process, the method is used to acquire mapping information of a correspondent node in an identification and location separation network, and the method comprises:

after a terminal switches and establishes a connection with a second access node at a switch-in side, the terminal sending a data message to the correspondent node; and after the second access node receives the data message sent by the terminal to the correspondent node, the second access node initiating an inquiry to an home Identity Location Register (ILR) of the correspondent node or to a first access node at a switch-out side so as to acquire the mapping information of the correspondent node according to identification of the correspondent node in the data message, if the identification and locator mapping information of the correspondent node cannot be searched out locally.

Before the step of the terminal switching, the method further comprises: when a communication is established between the terminal and the correspondent node, the first access node locally storing the identification and locator mapping information of all the correspondent nodes of the terminal.

The method further comprises: when the terminal accesses to the network, the access node to which the terminal accesses registering the identification and locator mapping information of the terminal to the home ILR of the terminal; the home ILR in the host of the terminal storing the mapping information of the terminal. The method also comprises: when the identification and locator mapping information of the terminal changes, the access node to which the terminal accesses sending to the home ILR of the terminal a notification which carries new mapping information of the terminal; after receiving the notification, the home ILR of the terminal updating the stored mapping information of the terminal based on the new mapping information.

The present invention also provides an information acquisition method in another switch process, wherein, the method is used to acquire mapping information of a correspondent node in an identification and location separation network, and the method comprises:

when a terminal switches, after a second access node at a switch-in side establishes a connection with the terminal, the second access node sending a switch response message to the first access node at a switch-out side;

after said first access node receives the switch response message, said first access node establishing a forwarding relationship with the second access node, and after receiving a data message sent by the correspondent node to the terminal during the switch, forwarding the data message to the second access node by the forwarding relationship; and after the second access node receives the data message forwarded by said first access node, the second access node acquiring the identification and locator mapping information of the correspondent node according to the identification and locator of the correspondent node in the data message.

The present invention also provides an information acquisition method in another switch process, wherein, the method is used to acquire mapping information of a correspondent node in an identification and location separation network and comprises:

an access node locally storing identification and locator mapping information of correspondent nodes of all accessed terminals; and when a terminal switches, an access node at the switch-in side, after receiving a data message sent by the terminal to the correspondent node, locally inquiring the identification and locator mapping information of the correspondent node according to the identification of the correspondent node in the data message.

The present invention also provides an information acquisition method in another switch process, wherein, the method is used to acquire mapping information of a correspondent node in an identification and location separation network and comprises:

when a communication is established between a terminal and the correspondent node, a first access node to which the terminal accesses locally storing identification and locator mapping information of all the correspondent nodes of the terminal;

after the terminal switches from the first access node to a second access node and establishes a connection with the second access node at a switch-in side, the terminal sending a data message to the correspondent node; and after the second access node receives the data message sent by the terminal to the correspondent node, the second access node initiating an inquiry to the first access node to acquire the mapping information of the correspondent node if the identification and locator mapping information of the correspondent node cannot be locally searched out, according to the identification of the correspondent node in the data message.

The present invention also provides an information acquisition method in another switch process, wherein, the method is used to acquire mapping information of a correspondent node in an identification and location separation network and comprises:

when a terminal accesses to the network, an access node to which the terminal accesses registering identification and locator mapping information of the terminal to a home ILR of the terminal, and the home ILR of the terminal storing the mapping information of the terminal; and when the mapping information of the terminal changes, the access node to which the terminal accesses sending a notification carrying new mapping information of the terminal to notify the home ILR of the terminal to update the mapping information of the terminal, and after the home ILR of the terminal receives the notification, the home ILR updating the stored mapping information of the terminal based on the new mapping information of the terminal; and after the terminal switches and establishes a connection with an access node at a switch-in side, the terminal sending a data message to the correspondent node, after the access node at the switch-in end receives the data message sent by the terminal to the correspondent node, according to an identification of the correspondent node in the data message, the access node at the switch-in end initiating an inquiry to a home identity location register (ILR) of the correspondent node to acquire the mapping information of the correspondent node, if the identification and locator mapping information of the correspondent node cannot be locally searched out.

The present invention also provides an information notification method in a switch process, wherein, the method is used to notify a correspondent node to update locator of a terminal in an identification and location separation network, and the method comprises:

when the terminal switches, a second access node at a switch-in side allocating a new locator to the terminal, after the terminal establishes a connection with said second access node, the terminal sending a data message to the correspondent node;

after the second access node receives the data message sent by the terminal to the correspondent node, according to an identification of the correspondent node in the data message, the second access node inquiring to a home ILR or a first access node at a switch-out side of the correspondent node to acquire the locator of the correspondent node, if the locator of the correspondent node cannot be locally searched out; and according to the acquired locator of the correspondent node, the second access node sending a notification carrying the identification and new locator of the terminal for updating the locator of the terminal to one or more access nodes to which the correspondent node accesses.

The invention also provides an information notification method in a switch process, wherein, the method is used to notify a correspondent node to a locator of a terminal in an identification and location separation network, and the method comprises:

when the terminal switches, a second access node at a switch-in side allocating a new locator to the terminal, and sending a switch response message to a first access node at a switch-out side;

after the first access node receives the switch response message, the first access node establishing a forwarding relationship with said second access node, and after receiving a data message sent by the correspondent node to the terminal during the switch, forwarding the data message to the second access node by the forwarding relationship; and after said second access node receives the data message forwarded by said first access node, said second access node sending a notification for updating the locator of the terminal to the correspondent node according to the identification and locator of the correspondent node in the data message, wherein, the notification carries the identification and new locator of the terminal.

The present invention also provides a method for forwarding a data message in a switch process, wherein, the method is used in an identification and location separation network and comprises:

when a terminal switches, a second access node at a switch-in side allocating a new locator to the terminal, after the terminal establishes a connection with said second access node, the terminal sending a data message to the correspondent node;

after the second access node receives the data message sent by the terminal to the correspondent node, according to the identification of the correspondent node in the data message, the second access node initiating an inquiry to a home ILR or a first access node at a switch-out side of the correspondent node to acquire the locator of the correspondent node, if the locator of the correspondent node cannot be locally searched out; and according to the acquired locator of the correspondent node, the second access node forwarding the data message to an access node to which the correspondent node accesses.

The present invention also provides a method for forwarding a data message in a switch process, wherein, the method is used in an identification and location separation network and comprises:

when a terminal switches, a second access node at a switch-in side allocating a new locator to the terminal, and after the terminal establishes a connection with said second access node, the terminal sending a data message to the correspondent node;

after the second access node receives the data message sent by the terminal to the correspondent node, according to an identification of the correspondent node in the data message, the second access node initiating an inquiry to a home ILR or a first access node at a switch-out side of the correspondent node to acquire the locator of the correspondent node, if the locator of the correspondent node cannot be locally searched out; and simultaneously forwarding the data message to the home ILR or the first access node of the correspondent node; and after the home ILR or the first access node of the correspondent node searches out the locator of the correspondent node according to the identification of the correspondent node in the data message, the home ILR or the first access node of the correspondent node forwarding the data message to the access node to which the correspondent node accesses.

The method might also comprise: after the home ILR or the first access node of the correspondent node receives the inquiry, the home ILR or the first access node of the correspondent node returning identification and locator mapping information of the correspondent node back to the second access node; the second access node receiving and locally storing the mapping information of the correspondent node, and if the data message sent by the terminal to the correspondent node is subsequently received, the second access node forwarding the data message to the access node to which the correspondent node accesses according to the mapping information of the correspondent node.

The present invention also provides a method for switching between the access nodes, wherein, the method is applied to an identification and location separation network and comprises:

when a terminal needs to switch from a first access node to a second access node, after said second access node receives a switch request sent by said first access node, said second access node allocating a new locator to the terminal and sending a switch response to said first access node;

after the first access node receives the switch response, the first access node sending a switch command to the terminal; after the terminal receives the switch command, the terminal initiating an access request to said second access node; and after the second access node receives the access request initiated by the terminal and establishes a connection with the terminal, the second access node acquiring identification and locator mapping information of the correspondent node of the terminal, and sending a switch complete message to the first access node.

The method might also comprise: after the second access node acquires the identification and locator mapping information of the correspondent node of the terminal, the second access node sending a notification for updating the locator of the terminal to an access node to which the correspondent node accesses, wherein, the notification carries the identification and new locator of the terminal; after the access node to which the correspondent node accesses receives the notification, the access node to which the correspondent node accesses updating the stored identification and locator mapping information of the terminal.

Before the step that the second access node sends the switch complete message to the first access node, it might also comprise: the second access node establishing a connection with the terminal through an access network, setting a switch complete timer after receiving the switch complete message sent by the access network, and sending the switch complete message to the first access node only when the switch complete timer reaches a timing cycle. The method might also comprise: after the second access node establishes a connection with the terminal, and before the switch complete timer reaches the timing cycle, if the second access node receives the data message sent by the terminal to the correspondent node, according to the identification of the correspondent node in the data message, the second access node initiating an inquiry to the home ILR or the first access node at the switch-out side of the correspondent node to acquire the locator of the correspondent node, if the locator of the correspondent node cannot be locally searched out.

The method might also comprise: after receiving the switch response message, the first access node establishing a forwarding relationship with the second access node, and after receiving the data message sent by the correspondent node to the terminal during the switch, the first access node forwarding the data message to the second access node through the forwarding relationship; and the second access node, after receiving the data message forwarded by the first access node before the switch complete timer reaches the timing cycle, acquiring the identification and locator mapping information of the correspondent node according to the identification and locator of the correspondent node in the data message.

The present invention also provides an access node, wherein, the access node is applied to an identification and location separation network, and comprises an opposite end information storage unit and a message transceiver unit, wherein, the opposite end information storage unit is set to store identification and locator mapping information of correspondent nodes of all accessed terminals;

the message transceiver unit is set to: after establishing a connection with the terminal that switches to the local access node, receive a data message sent by the terminal to the correspondent node, according to the identification of the correspondent node in the data message, initiate an inquiry to a home ILR or an original access node of the terminal before switch-in to acquire and locally store the mapping information of the correspondent node, if the identification and locator mapping information of the correspondent node cannot be locally searched out.

The message transceiver unit might be also set to: at the same time of initiating the inquiry to the ILR or the original access node, send the data message sent by the terminal to the correspondent node to the ILR or the original access node to forward.

The message transceiver unit is also set to: after acquiring the mapping information of the correspondent node, according to the acquired mapping information of the correspondent node, forward the data message sent by the terminal to the correspondent node to the access node to which the correspondent node accesses.

The access node might also comprise a locator allocation and notification unit which is connected with the message transceiver unit; the message transceiver unit is also set to: after acquiring and locally storing the mapping information of the correspondent node, transmit the acquired mapping information to the locator allocation and notification unit; the locator allocation and notification unit is set to: allocate a new locator to the terminal switching to the local access node, and notify the correspondent node to update the locator of the terminal when receiving the mapping information of the correspondent node sent by the message transceiver unit, and notification carries the identification and new locator of the terminal.

The present invention also provides another access node, wherein, the access node is applied to an identification and location separation network and comprises an opposite end information storage unit and a message transceiver unit, wherein, the correspondent node information storage unit is set to: locally store identification and locator mapping information of correspondent nodes of all accessed terminals;

the message transceiver unit is set to: after establishing a connection with a terminal switching to the local access node, when receiving a data message forwarded by an original access node of the terminal before switch-in and sent by the correspondent node of the terminal to the terminal, according to the identification and locator of the correspondent node in the data message, locally store the mapping information of the correspondent node, if the identification and locator mapping information of the correspondent node is not locally stored.

The access node might also comprise a locator allocation and notification unit connected with the message transceiver unit; the message transceiver unit is further set to: at the same time of locally storing the mapping information of the correspondent node, transmit the mapping information to the locator allocation and notification unit; the locator allocation and notification unit is set to: allocate a new locator to the terminal switching to the access node, as well as after receiving the mapping information of the correspondent node transmitted by the message transceiver unit, notify the correspondent node to update the locator of the terminal, and notification carries the identification and the new locator of the terminal.

The beneficial effects generated by the present invention are:

1. the present invention achieves the mobility switch management under the network-based identification and location separation framework, proposes a simplified switch management process with combination of the feature of the mobile communication network, proposes an optimized user data management method in the switch management processes, and defines the function distribution of each functional entity in the switch management process and the main procedures;

2. the present invention does not need to store the correspondent node table in network equipment such as the AN or the ILR, and it does not need signaling interaction and equipment processing load to establish, store and maintain the opposite end table;

3. the present invention improves the switch process, and the AN does not need to forward the data message in the way of data streams, thus reducing the load for forwarding the data message by the AN.

PREFERRED EMBODIMENTS OF THE
PRESENT INVENTION

In the following, the present invention will be described in further detail with combination of the accompanying drawings and specific examples.

The proposal of the network based identification and location separation architecture is to separate the dual function of the IP address to identify identification and location to achieve supporting problems including mobility, multi-home, dynamic IP address re-allocation, the routing load reduction and the exchange visits between different network regions in the next generation Internet.

The core idea of the network based identification and location separation architecture (hereinafter, also known as this architecture) is: this architecture network has two types of identifiers, identification (Access Identifier, referred to as AID) and locator (Routing-Location Identifier, referred to as RID). Wherein, the AID is a unique identification allocated to each user terminal in the network and is used in the access layer, and remains unchanged in the moving process of the user terminal; the AID is used to identify the opposite end between the user terminals within this architecture network, and the AID of the opposite end is used to communicate between the user terminals.

Figure 1:
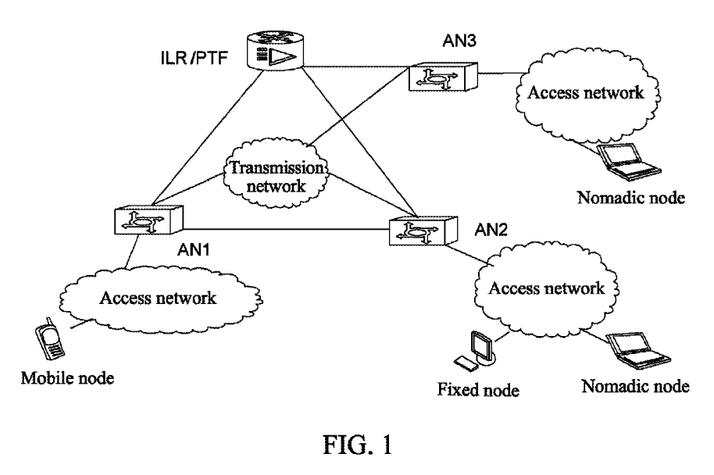
FIG. 1 is a diagram of a network topology in the network-based identification and location separation architecture in accordance with an example of the present invention.

FIG. 1 shows the main elements related to the switch in the network topology based on the identification and location separation architecture, the main elements comprise the access network, the AN, the identity location register (referred to as ILR) and the transmission network and so on, in the context, all the parts but the access network are considered as integral parts of the backbone network. Wherein:

the access network is set to provide two layer (the physical layer and the link layer) access service for the user terminals. The access network might be a base station system, such as the BSS (Base Station subsystem), the RAN (Radio Access Network), the eNodeB (evolved Node B) and so on, it might also be the xDSL (Digital subscriber Line), the AP (Access Point), and so on.

The AN is the boundary node between the access network and the backbone network, and is set to maintain the connection relationship between the terminal and the backbone network, allocate a RID to the terminal (the AN can be routed according to the RID), execute the switch process, execute the registration process, maintain and inquire the AID-RID mapping information of the correspondent node, encapsulate, route and forward data messages sent to or sent by the user terminal.

The ILR is set to accomplish the registration of the user terminal, to store and maintain the AID-RID mapping information of the user terminal and to process location query of the user terminal.

The transmission network is set to accomplish routing and forwarding of the data message whose source and destination addresses are in the format of RID between the user terminals that access via the access network.

The user terminals in the network might be one or more of the mobile nodes, the fixed nodes and the nomadic nodes. All communications of the user terminals are forwarded and managed by the ANs of the access network in which the user terminals are located. When a user terminal is powered on or when the user terminal's location changes, a registration process is initiated to the home ILR via the accessed AN, so that the home ILR saves the real-time AID-RID mapping information of the user terminal. The AN might request the ILR to inquiry the RID of the correspondent node through signaling. In the same AN, the data message between the user terminals is forwarded directly to the correspondent node. When the data message is forwarded between user terminals located in different ANs, the AN encapsulates the RID information of the terminal and the correspondent node when forwarding the data message sent by the terminal accessing to this AN, and then routes and forwards the data message through the transmission network; when receiving the data message sent to the terminal that accesses to this AN, the RID information is stripped off the data message and then forwarded to the terminal.

It should be noted that in a specific network based on the identification and location separation architecture, the aforementioned network elements might have different names. For example, the access node can also be referred to as the access server or the access switch router, the identity location register might also be called as the mapping server, the subscriber home register, the subscriber home server, and so on. The aforementioned network elements might correspond to one network element or a combination of multiple network elements, and for example, the access node contains the functions of ETR and ITR in the LISP network. The aforementioned network elements should be identified with the functions they fulfill.

In the following, the method for implementing switch management of the terminals under the aforementioned network architecture will be described in further detail with combination of the accompanying drawings and the specific examples.

Figure 2:
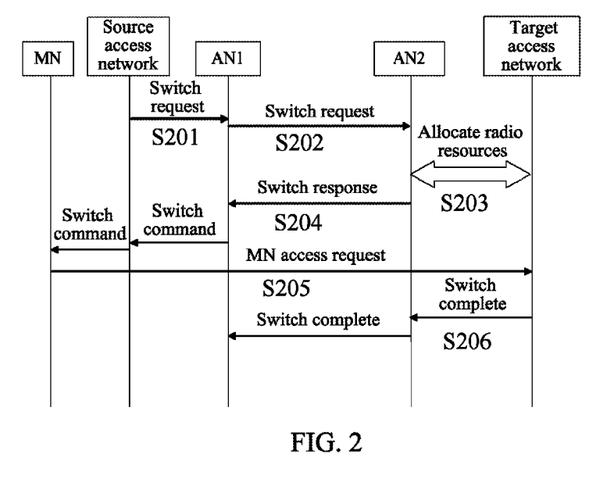
FIG. 2 is a schematic diagram of the switch process in accordance with an example of the present invention.

As shown in FIG. 2, the switch process of the mobile node in the moving process in this example mainly comprises the following steps.

In step 201, the source access network to which the MN currently accesses sends a switch request to the AN1 at the switch-out side, and the request carries the identifier information of the target access network and the user terminal, such as the AID of the MN.

In step 202, after the AN1 receives the switch request message, the AN1 finds the AN2 at the switch-in side according to the information of the target access network, and sends a switch request message carrying the identifier information of the MN to the AN2.

The AN1 may find the AN2 according to the corresponding relationship between the configured target access network and the AN2.

In step 203, after the AN2 receives the switch request message, the AN2 interacts with the target access network and allocates radio resources to the MN, and sends a switch response message to the AN1.

In step 204, after the AN1 receives the switch response message sent by the AN2, the AN1 establishes the data forwarding relationship with the AN1, and sends a switch command to the MN via the source access network.

In step 205, after the MN receives the switch command, the MN initiates an access request to the target access network.

In step 206, the target access network receives the access request from the MN, and after the access processing of the MN is accomplished, the target access network sends a switch complete message to the AN2, the AN2 establishes a connection to the MN and sends the switch complete message to the AN1.

So far, the MN completes the switch from the AN1 to the AN2.

In addition, in the aforementioned switch process, after the AN2 receives the switch request from the AN1 in step 203, the AN2 further allocates a new RID to the MN, establishes the AID and the new RID mapping information of the MN, and initiates a request for updating the mapping information to the home ILR of the MN to update the AID-RID mapping information of the MN stored by the ILR.

The switch management method in the present example might also comprise forwarding processing of the data message between the MN and the CN in the switch process. The processing of forwarding the data message sent by the CN to the MN as well as sent by the MN to the CN in the switch process will be described in the following with combination of the accompanying drawings and specific examples.

Figure 3:
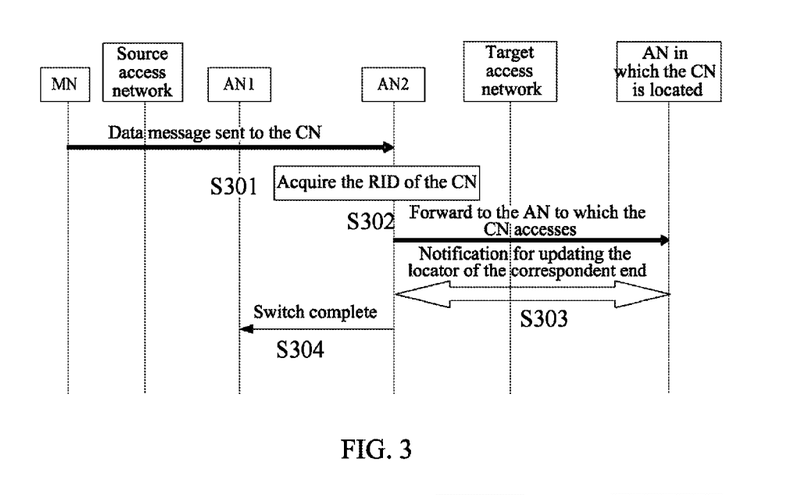
FIG. 3 is a schematic diagram of the process of forwarding the data message sent by the MN to the CN after the MN switches in accordance with an example of the present invention.

As shown in FIG. 3, after the MN accesses to the AN2, the processing of the AN2 forwarding the data message sent by the MN to the CN is as follows.

In step 301, when the AN2 receives the data message sent by the MN to the CN, the AN2 acquires the RID of the CN according to the AID of the CN in the data message.

In this step, the AN2 can acquire the RID of the CN in the following way.

1. According to the AID of the CN in the data message, the AN2 locally inquiries the AID-RID mapping information of the CN, wherein, the AN2 might already locally save the AID-RID mapping information of the CN via other accessed terminals that are communicating with the CN.

2. If the AN2 does not locally search out the AID-RID mapping information of the CN, the AN2 searches out the AID-RID mapping information of the CN from the home ILR of the CN and locally stores the AID-RID mapping information.

3. If the AN2 does not locally search out the AID-RID mapping information of the CN, the AN2 searches out the AID-RID mapping information of the CN from the AN1 and locally stores the AID-RID mapping information.

4. If the AN2 does not locally search out the AID-RID mapping information of the CN, at the same time of initiating a mapping inquiry to the home ILR of the AN1 or the CN, the AN2 forwards the data message to the AN1 or the home PTF of the CN; after the AN1 or the home ILR of the CN receives the data message, the AN1 or the home ILR of the CN sends the AID-RID mapping information of the CN to the AN2 according to the AID of the CN in the data message.

After the AN1 or the home PTF of the CN receives the data message sent by the AN2, the AN1 or the home PTF of the CN searches out the corresponding RID according to the AID of the CN in the data message and encapsulates the RID in the data message, and then forwards the data message to the AN to which the CN accesses via the transmission network.

The AN2 might also send a mapping inquiry to the AN1 or the home PTF of the CN, and after acquiring the mapping information of the CN, the AN2 forwards the data message to the AN to which the CN accesses via the transmission network.

In step 302, after the AN2 acquires the AID-RID mapping information of the CN, the AN2 encapsulates the RID of the CN in the data message sent by the MN to the CN, and sends the data message via the transmission network to the AN to which the CN accesses.

In step 303, (this step and step 302 have no particular order) after the AN2 acquires the AID-RID mapping information of the CN, the AN2 sends a notification for updating the locator of the correspondent node to the CN, and the notification carries the new RID allocated to the MN; after the AN to which the CN accesses receives the notification, this AN updates the saved the AID-RID mapping information of the MN according to the new RID of the MN in the notification and returns a successful response.

In step 304, after the AN2 acquires the mapping information of all the CNs, the AN2 sends a switch complete message to the AN1.

In the step 303, after the AN2 receives the switch complete message sent by the target access network, the AN2 might set a switch complete timer Tc, and the AN2 sends a switch complete message to the AN1 after the Tc expires. During the period of Tc, the AN2 acquires the AID-RID mapping information of the correspondent node of the MN.

In the aforementioned process, the AN1 does not need to send the information of the communication relationship (such as the correspondent node table) between the MN and the correspondent nodes to the AN2 in the switch process, which reduces the signaling load of the access node.

Figure 4:
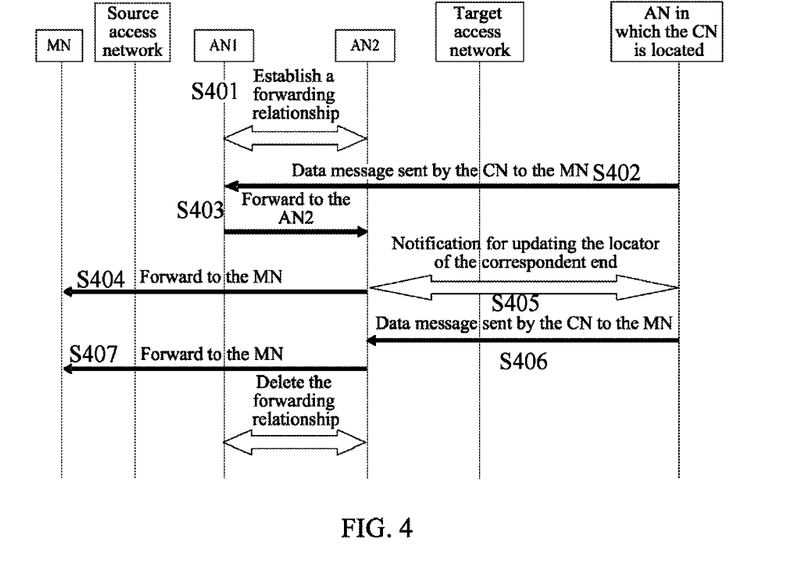
FIG. 4 is a schematic diagram of the process of forwarding the data message sent by the CN to the MN after the MN switches in accordance with an example of the present invention.

Refer to FIG. 4, when the MN is in a switch process, the processing of forwarding the data message sent by the CN to the MN is as follows.

In step 401, the MN switches, after the AN1 receives the switch response message sent by the AN2, the AN1 establishes a forwarding relationship with the AN2.

In step 402, before the AN to which the CN accesses updates the mapping information of the MN, the AN continues to send the data message sent by the CN to the MN to the AN1.

In step 403, after the AN1 receives these data messages, the AN1 forwards the data message to the AN2 according to the forwarding relationship established between the AN1 and the AN2.

Specifically, the tunnel encapsulation method is used between the AN1 and the AN2 for data forwarding.

In step 404, after the AN2 receives these data messages, the AN2 sends them to the MN.

The AN2 might cache the received data messages, and after the connection with the MN is established, the AN2 sends the data messages to the MN.

In step 405, when the AN2 receives the data message forwarded by the AN1 and sent by the AN to which the CN accesses, the AN2 sends a notification for updating the locator of the correspondent node to the CN according to the CN identifier information in the data message, and the notification carries the new RID allocated to the MN, after the AN to which the CN accesses receives the notification, the AN updates the saved AID-RID mapping information of the MN according to the new RID of the MN in the notification (there is no specific order between this step and step 404)

In step 406, after the AN to which the CN accesses updates the saved mapping information of the MN, the AN encapsulates the new RID of the MN in the data message when receiving the data message sent by the CN to the MN, and sends the data packets to the AN2 through the transmission network.

In step 407, after the AN2 receives these data messages, it sends the data messages to the MN.

After the AN2 sends a switch complete message and receives the data message forwarded by the AN1, it deletes its forwarding relationship with the AN1. After the AN1s sends the switch complete message from the AN2 and forwards the data message sent to the MN, the AN1 deletes its forwarding relationship with the AN2 and also deletes the MN related information. For each correspondent node of the MN, if the correspondent node does not communicate with any other terminals accessing to the AN1, the mapping and routing information of this correspondent node is deleted.

Optionally, the AN1 or the AN2 might set a deletion timer when receiving or sending a switch complete message, and when the deletion timer expires, the AN1 or the AN2 deletes the established forwarding relationship, and notifies the correspondent node to delete the forwarding relationship.

In the aforementioned process, it also comprises the implementing method of how the AN2 obtains the mapping information of the MN's correspondent node in the case that the AN1 does not send the correspondent node table, as well as how to notify the AN to which the correspondent node accesses of the new locator or the mapping information of the MN.

The aforementioned several processes comprise: the AN2 inquiries to obtain the map information of the CN when the AN2 forwards the data message sent by the MN after the MN switches in; and the AN2 notifies the updated mapping information of the MN to the AN to which the CN accesses when receiving the data message forwarded by the AN1, and so on. The processes might be performed individually rather than are restricted in the same process.

The aforementioned examples are described by taking the network based identification and location separation architecture for example. Wherein, the network architecture on which the technical scheme of the present invention is based might be the LISP (Locator/ID Separation Protocol)+ALT (Alternative Logical Topology), or the integrated network, and so on. The specific implementation steps in the aforementioned examples of the present invention can be applied to all these network architectures.

Figure 5:
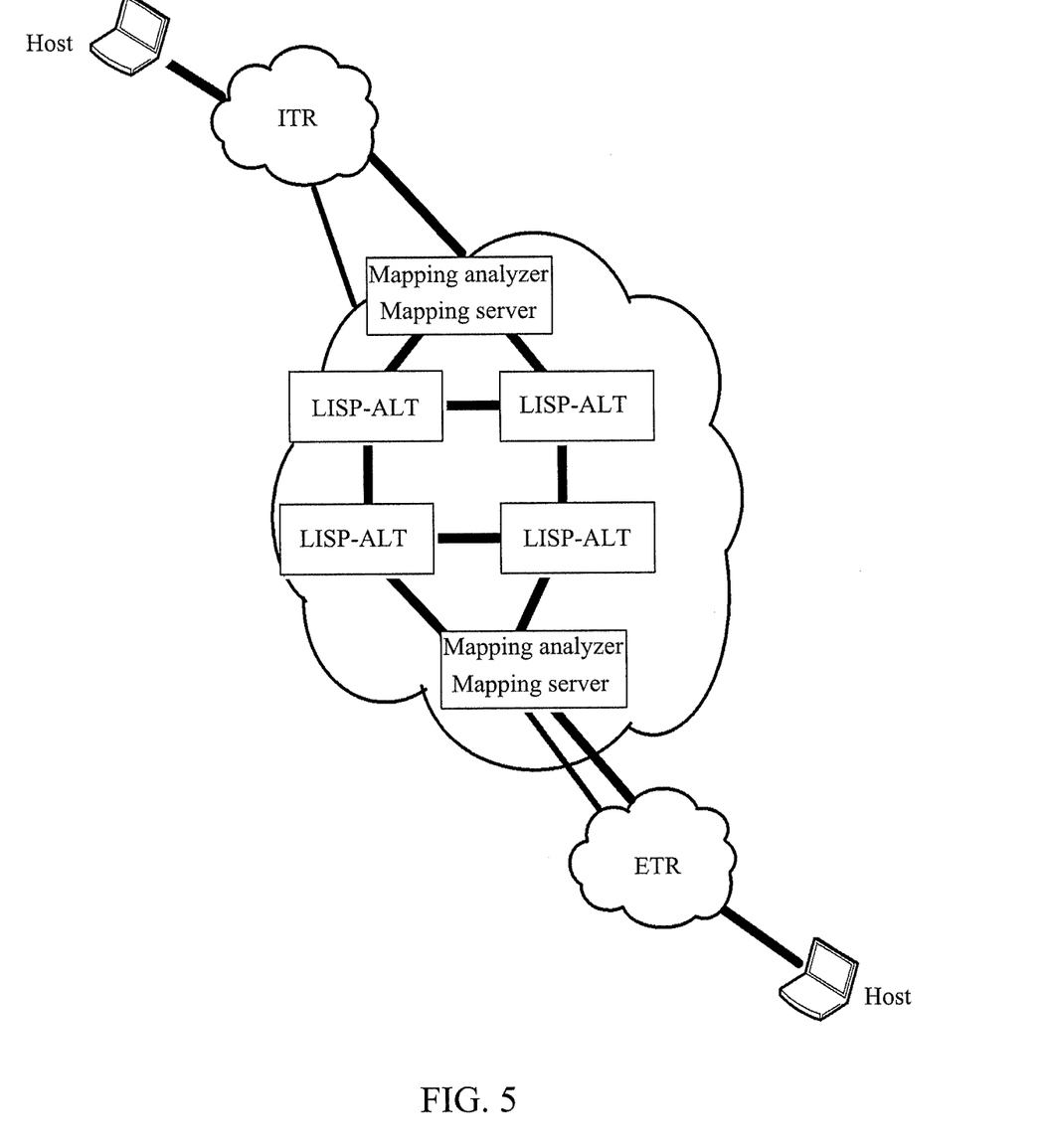
FIG. 5 is a diagram of the network topology in the LISP protocol based identification and location separation architecture in accordance with an example of the present invention.

FIG. 5 is a diagram of the LISP+ALT network architecture, wherein, the Endpoint identifier (EID) of the host corresponds to the AID, and the RLOC (Routing Locator) corresponds to the RID. The AN in the present invention is equivalent to the function combination of the ETR (Egress Tunnel Router)/ITR (Ingress Tunnel Router), and the ETR and the ITR also have the function corresponding to the identity location register in the embodiments of the present invention.

In the network architecture of this example, tunnel routers are introduced in the LISP system, and the terminal encapsulates the LISP in the data message when sending the data message and de-capsulates the data message before the data message are sent to the destination. In the peer-to-peer message switch process between the terminals in two networks, the ITR encapsulates a new LISP header for each message, and this header is stripped off in the ETR. The operation corresponds to that in the present invention, the AN identifies and encapsulates the data message of the terminal and then transports the data message in the backbone network, after the data message sent to the terminal are received, the AN de-capsulates and then sends the data message to the terminal.

The IP address of "the outer header" in the LISP data message is RLOCs. The ITR searches the EID-to-RLOC to determine the routing path to the ETR, and the ETR takes the RLOC as one of its addresses. This operation corresponds to the step that in the first or second example, the ASN encapsulates the RID routing information in the data message sent by the terminal, and routes and forwards the data message to the ASN in which the correspondent node pointed by the destination RID is located via the generalized forwarding plane.

The ALT acts as a topology structure in the Internet, and it is identified as a plane with specific function according to the definition method in the LISP system, which is equivalent to the mapping forwarding plane in the backbone network in the first or second example.

Figure 6:
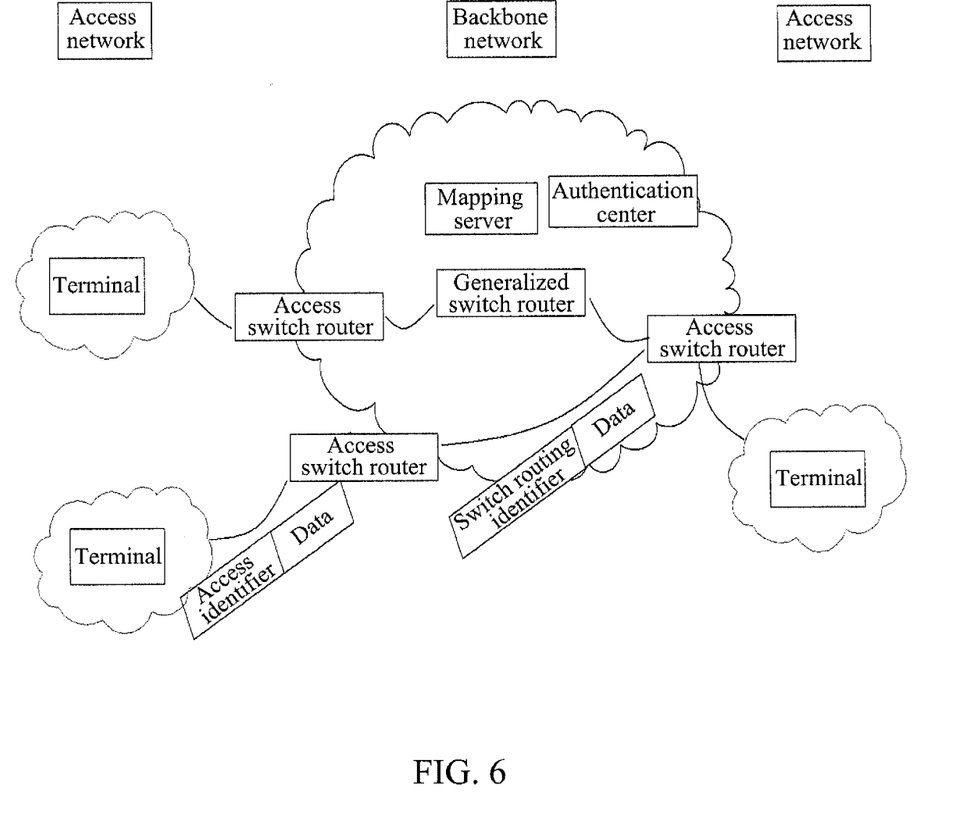
FIG. 6 is a diagram of the network topology in the identification and location separation architecture of the integrated network in accordance with an example of the present invention.

FIG. 6 is a diagram of the network architecture in the integrated network, wherein, the access router corresponds to the AN in the technical scheme of the present invention, the mapping server corresponds to the identity location register in the technical scheme of the present invention, the access identifier corresponds to the RID, the switch route identifier corresponds to the RID. The difference between the integrated network and the network architecture on which the present invention is based is that, the mapping server does not have the data message forwarding function, which means that the problem of forwarding the first message of which the RID cannot be searched out locally cannot be solved, however, this problem has no direct relationship with the switch process of the present invention.

In addition, the present invention also provides an access node to be applied to an identification and location separation network, and comprises an opposite end information storage unit and a message transceiver unit, wherein, the opposite end information storage unit is set to store identification and locator mapping information of correspondent nodes of all accessed terminals;

the message transceiver unit is set to: after establishing a connection with the terminal that switches to the local access node, receive a data message sent by the terminal to the correspondent node, according to the identification of the correspondent node in the data message, initiate an inquiry to a home ILR or an original access node of the terminal before switch-in to acquire and locally store the mapping information of the correspondent node, if the identification and locator mapping information of the correspondent node cannot be locally searched out.

Furthermore, the message transceiver unit is further set to: at the same time of initiating the inquiry to the ILR or the original access node, send the data message sent by the terminal to the correspondent node to the ILR or the original access node to forward.

Furthermore, the message transceiver unit is also set to: after acquiring the mapping information of the correspondent node, according to the acquired mapping information of the correspondent node, forward the data message sent by the terminal to the correspondent node to the access node to which the correspondent node accesses.

Furthermore, the access node might also comprise a locator allocation and notification unit that is connected with the message transceiver unit;

the message transceiver unit might also be set to: receive the data message sent by the terminal to the correspondent node, acquire and locally store the mapping information of the correspondent node, and send to the locator allocation and notification unit;

the locator allocation and notification unit is set to: allocate a new locator to the terminal switching to the local access node, and notify the correspondent node to update the locator of the terminal when receiving the mapping information of the correspondent node sent by the message transceiver unit, and notification carries the identification and new locator of the terminal.

The present invention also provides another access node, which is applied to an identification and location separation network and comprises an opposite end information storage unit and a message transceiver unit, wherein, the correspondent node information storage unit is set to: locally store identification and locator mapping information of correspondent nodes of all accessed terminals;

the message transceiver unit is set to: after establishing a connection with a terminal switching to the local access node, when receiving a data message forwarded by an original access node of the terminal before switch-in and sent by the correspondent node of the terminal to the terminal, according to the identification and locator of the correspondent node in the data message, locally store the mapping information of the correspondent node, if the identification and locator mapping information of the correspondent node is not locally stored.

Furthermore, the access node further comprises a locator allocation and notification unit connected with the message transceiver unit; wherein, the message transceiver unit might be set to: when locally storing the mapping information of the correspondent node according to the received data message, transmit the mapping information to the locator allocation and notification unit;

the locator allocation and notification unit is set to: allocate a new locator to the terminal switching to the access node, as well as when receiving the mapping information of the correspondent node transmitted by the message transceiver unit, notify the correspondent node to update the locator of the terminal, and notification carries the identification and the new locator of the terminal.

In summary, the present invention has the following features:

when the AN at the switch-in side receives the data message sent by the MN to the CN, the AN at the switch-in side may acquire the CN's mapping information by inquiring the CN's mapping and routing information locally or by inquiring the home ILR of the CN or the AN at the switch-out side, in the switch process, the AN at the switch-out side does not need to send the correspondent node table to the AN at the switch-in side, thus to avoid the AN signaling burst in the switch process;

the present invention improves the switch process so that the AN does not need to forward the data message in the way of data streams, thus avoiding the processing such as the data stream establishment, the data stream mapping, and the data stream connected/disconnected monitoring, and reducing the processing load of the AN;

in addition, by establishing the forwarding relationship between the AN at the switch-out side and the AN at the switch-in side, the problem of forwarding the data message in the switch process is solved, thus avoiding the message from being discarded in the switch process.

INDUSTRIAL APPLICABILITY

Compared with the related art, the present invention optimizes the user data management method in the switch management processes, and defines the function distribution and the main process of each functional entity; the present invention improves the switch process, so that the AN does not need to forward the data message in the way of data streams, thus reducing the processing load for forwarding the data message by the AN.

What is claimed is:

1. An information acquisition method in a switch process, wherein, the method is used to acquire mapping information of a correspondent node, and the method comprises:

after a terminal switches from a first access node at a switch-out side and establishes a connection with a second access node at a switch-in side, the terminal sending a data message to the correspondent node; and after the second access node receives the data message sent by the terminal to the correspondent node, the second access node initiating an inquiry to an home Identity Location Register (ILR) of the correspondent node or to a first access node at a switch-out side so as to acquire the mapping information of the correspondent node according to Access Identifier (AID) of the correspondent node in the data message, if the AID and Routing Location Identifier (RID) mapping information of the correspondent node cannot be searched out locally;

wherein the method is applied to an identification and location separation network, each of the first access node and the second access node is a node in an access network of the identification and location separation network.

2. The method of claim 1, wherein, before the step that the terminal switches, the method further comprises:

when a communication is established between the terminal and the correspondent node, the first access node locally storing the AID and RID mapping information of all the correspondent nodes of the terminal.

3. The method of claim 1, wherein, the method further comprises:

when the terminal accesses to the network, the access node to which the terminal accesses registering the AID and RID mapping information of the terminal to the home ILR of the terminal;

the home ILR in the host of the terminal storing the mapping information of the terminal.

4. The method of claim 3, wherein, the method also comprises:

when the AID and RID mapping information of the terminal changes, the access node to which the terminal accesses sending to the home ILR of the terminal a notification which carries new mapping information of the terminal;

after receiving the notification, the home ILR of the terminal updating the stored mapping information of the terminal based on the new mapping information.

5. An information acquisition method in a switch process, wherein, the method is used to acquire mapping information of a correspondent node, and the method comprises:

when a terminal switches from a first access node at a switch-out side, after a second access node at a switch-in side establishes a connection with the terminal, the second access node sending a switch response message to the first access node at a switch-out side;

after said first access node receives the switch response message, said first access node establishing a forwarding relationship with the second access node, and after receiving a data message sent by the correspondent node to the terminal during the switch, forwarding the data message to the second access node by the forwarding relationship; and after the second access node receives the data message forwarded by said first access node, the second access node acquiring the Access Identifier (AID) and Routing Location Identifier (RID) mapping information of the correspondent node according to the AID and RID of the correspondent node in the data message;

wherein the method is applied to an identification and location separation network, each of the first access node and the second access node is a node in an access network of the identification and location separation network.

6. An information acquisition method in a switch process, wherein, the method is used to acquire mapping information of a correspondent node, comprises:
   an access node locally storing Access Identifier (AID) and Routing Location Identifier (RID) mapping information of correspondent nodes of all accessed terminals; and
   when a terminal switches, an access node at the switch-in side, after receiving a data message sent by the terminal to the correspondent node, locally inquiring the AID and RID mapping information of the correspondent node according to the AID of the correspondent node in the data message;
   wherein the method is applied to an identification and location separation network, each of the first access node and the second access node is a node in an access network of the identification and location separation network.

7. An information acquisition method in a switch process, wherein, the method is used to acquire mapping information of a correspondent node, comprises:
   when a communication is established between a terminal and the correspondent node, a first access node to which the terminal accesses locally storing Access Identifier (AID) and Routing Location identifier (RID) mapping information of all the correspondent nodes of the terminal;
   after the terminal switches from the first access node to a second access node and establishes a connection with the second access node at a switch-in side, the terminal sending a data message to the correspondent node; and
   after the second access node receives the data message sent by the terminal to the correspondent node, the second access node initiating an inquiry to the first access node to acquire the mapping information of the correspondent node if the AID and RID mapping information of the correspondent node cannot be locally searched out, according to the AID of the correspondent node in the data message;
   wherein the method is applied to an identification and location separation network, each of the first access node and the second access node is a node in an access network of the identification and location separation network.

8. An information acquisition method in a switch process, wherein, the method is used to acquire mapping information of a correspondent node, comprises:
   when a terminal accesses to the network, an access node to which the terminal accesses registering Access Identifier (AID) and Routing Location Identifier (RID) mapping information of the terminal to a home ILR of the terminal, and the home ILR of the terminal storing the mapping information of the terminal;
   when the mapping information of the terminal changes, the access node to which the terminal accesses sending a notification carrying new mapping information of the terminal to notify the home ILR of the terminal to update the mapping information of the terminal, and after the home ILR of the terminal receives the notification, the home ILR updating the stored mapping information of the terminal based on the new mapping information of the terminal; and
   after the terminal switches from a first access node at a switch-out side and establishes a connection with a second access node at a switch-in side, the terminal sending a data message to the correspondent node, after the second access node at the switch-in end receives the data message sent by the terminal to the correspondent node, according to an AID of the correspondent node in the data message, the access node at the switch-in end initiating an inquiry to a home identity location register (ILR) of the correspondent node to acquire the mapping information of the correspondent node, if the AID and RID mapping information of the correspondent node cannot be locally searched out;
   wherein the method is applied to an identification and location separation network, each of the first access node and the second access node is a node in an access network of the identification and location separation network.

9. An information notification method in a switch process, wherein, the method is used to notify a correspondent node to update Routing Location Identifier (RID) of a terminal, and the method comprises:
   when the terminal switches from a first access node at a switch-out side, a second access node at a switch-in side allocating a new RID to the terminal, after the terminal establishes a connection with said second access node, the terminal sending a data message to the correspondent node;
   after the second access node receives the data message sent by the terminal to the correspondent node, according to an Access Identifier (AID) of the correspondent node in the data message, the second access node inquiring to a home ILR or a first access node at a switch-out side of the correspondent node to acquire the RID of the correspondent node, if the RID of the correspondent node cannot be locally searched out; and
   according to the acquired RID of the correspondent node, the second access node sending a notification carrying the AID and new RID of the terminal for updating the RID of the terminal to one or more access nodes to which the correspondent node accesses;
   wherein the method is applied to an identification and location separation network, each of the first access node and the second access node is a node in an access network of the identification and location separation network.

10. An information notification method in a switch process, wherein, the method is used to notify a correspondent node to a Routing Location Identifier (RID) of a terminal, and the method comprises:
    when the terminal switches from a first access node at a switch-out side, a second access node at a switch-in side allocating a new RID to the terminal, and sending a switch response message to a first access node at a switch-out side;
    after the first access node receives the switch response message, the first access node establishing a forwarding relationship with said second access node, and after receiving a data message sent by the correspondent node to the terminal during the switch, forwarding the data message to the second access node by the forwarding relationship; and
    after said second access node receives the data message forwarded by said first access node, said second access node sending a notification for updating the RID of the terminal to the correspondent node according to the Access identifier (AID) and RID of the correspondent node in the data message, wherein, the notification carries the AID and new RID of the terminal;
    wherein the method is applied to an identification and location separation network, each of the first access node and the second access node is a node in an access network of the identification and location separation network.

11. A method for forwarding a data message in a switch process, wherein, the method comprises:

when a terminal switches from a first access node at a switch-out side, a second access node at a switch-in side allocating a new Routing Location Identifier (RID) to the terminal, after the terminal establishes a connection with said second access node, the terminal sending a data message to the correspondent node;

after the second access node receives the data message sent by the terminal to the correspondent node, according to the Access Identifier (AID) of the correspondent node in the data message, the second access node initiating an inquiry to a home ILR or a first access node at a switch-out side of the correspondent node to acquire the RID of the correspondent node, if the RID of the correspondent node cannot be locally searched out; and according to the acquired RID of the correspondent node, the second access node forwarding the data message to an access node to which the correspondent node accesses;

wherein the method is applied to an identification and location separation network, each of the first access node and the second access node is a node in an access network of the identification and location separation network.

12. A method for forwarding a data message in a switch process, wherein, the method comprises:

when a terminal switches from a first access node at a switch-out side, a second access node at a switch-in side allocating a new Routing Location Identifier (RID) to the terminal, and after the terminal establishes a connection with said second access node, the terminal sending a data message to the correspondent node;

after the second access node receives the data message sent by the terminal to the correspondent node, according to an Access Identifier (AID) of the correspondent node in the data message, the second access node initiating an inquiry to a home ILR or a first access node at a switch-out side of the correspondent node to acquire the RID of the correspondent node, if the RID of the correspondent node cannot be locally searched out; and simultaneously forwarding the data message to the home ILR or the first access node of the correspondent node; and after the home ILR or the first access node of the correspondent node searches out the RID of the correspondent node according to the AID of the correspondent node in the data message, the home ILR or the first access node of the correspondent node forwarding the data message to the access node to which the correspondent node accesses;

wherein the method is applied to an identification and location separation network, each of the first access node and the second access node is a node in an access network of the identification and location separation network.

13. The method of claim 12, wherein, the method further comprises:

after the home ILR or the first access node of the correspondent node receives the inquiry, the home ILR or the first access node of the correspondent node returning AID and RID mapping information of the correspondent node back to the second access node;

the second access node receiving and locally storing the mapping information of the correspondent node, and if the data message sent by the terminal to the correspondent node is subsequently received, the second access node forwarding the data message to the access node to which the correspondent node accesses according to the mapping information of the correspondent node.

14. A method for switching between access nodes, wherein, the method comprises:

when a terminal needs to switch from a first access node to a second access node, after said second access node receives a switch request sent by said first access node, said second access node allocating a new Routing Location Identifier (RID) to the terminal and sending a switch response to said first access node;

after the first access node receives the switch response, the first access node sending a switch command to the terminal; after the terminal receives the switch command, the terminal initiating an access request to said second access node; and after the second access node receives the access request initiated by the terminal and establishes a connection with the terminal, the second access node acquiring Access Identifier (AID) and RID mapping information of the correspondent node of the terminal, and sending a switch complete message to the first access node;

wherein the method is applied to an identification and location separation network, each of the first access node and the second access node is a node in an access network of the identification and location separation network.

15. The method of claim 14, wherein, the method further comprises:

after the second access node acquires the AID and RID mapping information of the correspondent node of the terminal, the second access node sending a notification for updating the RID of the terminal to an access node to which the correspondent node accesses, wherein, the notification carries the AID and new RID of the terminal;

after the access node to which the correspondent node accesses receives the notification, the access node to which the correspondent node accesses updating the stored AID and RID mapping information of the terminal.

16. The method of claim 14, wherein, before the step that the second access node sends the switch complete message to the first access node, the method further comprises:

the second access node establishing a connection with the terminal through an access network, setting a switch complete timer after receiving the switch complete message sent by the access network, and sending the switch complete message to the first access node only when the switch complete timer reaches a timing cycle.

17. The method of claim 16, wherein, the method further comprises:

after the second access node establishes a connection with the terminal, and before the switch complete timer reaches the timing cycle, if the second access node receives the data message sent by the terminal to the correspondent node, according to the AID of the correspondent node in the data message, the second access node initiating an inquiry to the home ILR or the first access node at the switch-out side of the correspondent node to acquire the RID of the correspondent node, if the RID of the correspondent node cannot be locally searched out.

18. The method of claim 16, wherein, the method further comprises:

after receiving the switch response message, the first access node establishing a forwarding relationship with the second access node, and after receiving the data message sent by the correspondent node to the terminal during the switch, the first access node forwarding the data message to the second access node through the forwarding relationship; and the second access node, after receiving the data message forwarded by the first access node before the switch complete timer reaches the timing cycle, acquiring the AID and RID mapping information of the correspondent node according to the AID and RID of the correspondent node in the data message.

19. An access node, comprises an opposite end information storage unit and a message transceiver unit, wherein, the opposite end information storage unit is set to store Access Identifier (AID) and Routing Location Identifier (RID) mapping information of correspondent nodes of all accessed terminals;

the message transceiver unit is set to: after establishing a connection with the terminal that switches to the local access node, receive a data message sent by the terminal to the correspondent node, according to the AID of the correspondent node in the data message, initiate an inquiry to a home ILR or an original access node of the terminal before switch-in to acquire and locally store the mapping information of the correspondent node, if the AID and RID mapping information of the correspondent node cannot be locally searched out;

wherein, the access node is applied to an identification and location separation network and is a node in an access network of the identification and location separation network.

20. The access node of claim 19, wherein, the message transceiver unit is further set to: at the same time of initiating the inquiry to the ILR or the original access node, send the data message sent by the terminal to the correspondent node to the ILR or the original access node to forward.

21. The access node of claim 19, wherein, the message transceiver unit is also set to: after acquiring the mapping information of the correspondent node, according to the acquired mapping information of the correspondent node, forward the data message sent by the terminal to the correspondent node to the access node to which the correspondent node accesses.

22. The access node of claim 19, wherein, the access node also comprises a RID allocation and notification unit which is connected with the message transceiver unit;

the message transceiver unit is also set to: after acquiring and locally storing the mapping information of the correspondent node, transmit the acquired mapping information to the RID allocation and notification unit;

the RID allocation and notification unit is set to: allocate a new RID to the terminal switching to the local access node, and notify the correspondent node to update the RID of the terminal when receiving the mapping information of the correspondent node sent by the message transceiver unit, and notification carries the AID and new RID of the terminal.

23. An access node, comprises an opposite end information storage unit and a message transceiver unit, wherein, the correspondent node information storage unit is set to: locally store Access Identifier (AID) and Routing Location Identifier (RID) mapping information of correspondent nodes of all accessed terminals;

the message transceiver unit is set to: after establishing a connection with a terminal switching to the local access node, when receiving a data message forwarded by an original access node of the terminal before switch-in and sent by the correspondent node of the terminal to the terminal, according to the AID and RID of the correspondent node in the data message, locally store the mapping information of the correspondent node, if the AID and RID mapping information of the correspondent node is not locally stored;

wherein the access node is applied to an identification and location separation network and is a node in an access network of the identification and location separation network.

24. The access node of claim 23, wherein, the access node further comprises a RID allocation and notification unit connected with the message transceiver unit;

the message transceiver unit is further set to: at the same time of locally storing the mapping information of the correspondent node, transmit the mapping information to the RID allocation and notification unit;

the RID allocation and notification unit is set to: allocate a new RID to the terminal switching to the access node, as well as after receiving the mapping information of the correspondent node transmitted by the message transceiver unit, notify the correspondent node to update the RID of the terminal, and notification carries the AID and the new RID of the terminal.

25. The method of claim 15, wherein, before the step that the second access node sends the switch complete message to the first access node, the method further comprises:

the second access node establishing a connection with the terminal through an access network, setting a switch complete timer after receiving the switch complete message sent by the access network, and sending the switch complete message to the first access node only when the switch complete timer reaches a timing cycle.

26. The method of claim 25, wherein, the method further comprises:

after the second access node establishes a connection with the terminal, and before the switch complete timer reaches the timing cycle, if the second access node receives the data message sent by the terminal to the correspondent node, according to the AID of the correspondent node in the data message, the second access node initiating an inquiry to the home ILR or the first access node at the switch-out side of the correspondent node to acquire the RID of the correspondent node, if the RID of the correspondent node cannot be locally searched out.

27. The method of claim 25, wherein, the method further comprises:

after receiving the switch response message, the first access node establishing a forwarding relationship with the second access node, and after receiving the data message sent by the correspondent node to the terminal during the switch, the first access node forwarding the data message to the second access node through the forwarding relationship; and the second access node, after receiving the data message forwarded by the first access node before the switch complete timer reaches the timing cycle, acquiring the AID and RID mapping information of the correspondent node according to the AID and RID of the correspondent node in the data message.

* * * * *